(12) United States Patent
Green et al.

(10) Patent No.: US 9,939,042 B1
(45) Date of Patent: Apr. 10, 2018

(54) VIBRATION ISOLATION DEVICES

(71) Applicant: MGM PRODUCTS, INC., Conyers, GA (US)

(72) Inventors: Dotson Carson Green, Conyers, GA (US); William Blair Wilder, Mansfield, GA (US); Adnan Bijelic, Loganville, GA (US)

(73) Assignee: MGM Products, Inc., Conyers, GA (US)

( * ) Notice: Subject to any disclaimer, the term of this patent is extended or adjusted under 35 U.S.C. 154(b) by 0 days.

(21) Appl. No.: 15/069,957

(22) Filed: Mar. 14, 2016

Related U.S. Application Data

(60) Provisional application No. 62/132,493, filed on Mar. 12, 2015.

(51) Int. Cl.
| | |
|---|---|
| *F16F 15/067* | (2006.01) |
| *F16F 3/04* | (2006.01) |
| *F16M 13/00* | (2006.01) |
| *F16M 11/24* | (2006.01) |
| *B60G 17/02* | (2006.01) |

(Continued)

(52) U.S. Cl.
CPC .......... *F16F 15/067* (2013.01); *F16M 11/24* (2013.01); *B60G 17/021* (2013.01); *B60G 17/025* (2013.01); *F16F 3/04* (2013.01); *F16F 7/00* (2013.01); *F16F 15/04* (2013.01)

(58) Field of Classification Search
CPC .......... F16F 15/02; F16F 1/04; F16F 15/0275; F16F 15/04; F16F 15/067; F16F 7/00; F16F 7/08; F16F 3/04; F24F 1/40; F24F 2230/007; G11B 33/08; B60G 17/021; B60G 17/035; F16M 11/24
USPC ....... 248/573, 637, 644, 658, 669, 638, 561, 248/562, 566; 267/127, 136, 140.11, 267/140.3, 140.4; 188/378, 379, 380
See application file for complete search history.

(56) References Cited

U.S. PATENT DOCUMENTS

| | | | | |
|---|---|---|---|---|
| 4,722,505 A | * | 2/1988 | Kaiser | ............ G11B 33/08 248/561 |
| 5,067,684 A | * | 11/1991 | Garnjost | ......... F16F 15/027 248/550 |

(Continued)

*Primary Examiner* — Tan Le
(74) *Attorney, Agent, or Firm* — Michael J. Bootcheck, LLC; Michael Jonathan Bootcheck

(57) ABSTRACT

A device for isolating vibration and motion which may be used to dampen or isolate vibrations and motion from heating, ventilation, air conditioning, mechanical and/or electro-mechanical equipment to reduce or eliminate the deleterious effects of vibration, movement and excessive noise created by the equipment. The device includes one or more pairs of vertical limiters, one or more springs, a pair of and at least two flanges. The frame members are each in a fixed relation to at least one vertical limiter which has a slot therein wherein the vertical limiters each have a respective engagement portion/cross beam which is partially passed through the opposing vertical limiters slot such that the vertical limiter pair allows the flanges each to move in toward or away from each other, but wherein the vertical limiters function as to prevent twisting or sliding of the flanges with respect to each other. The spring assemblies and vertical limiters receive and diminish the undesirable phenomena created by the equipment or other sources of vibrations or motion.

15 Claims, 8 Drawing Sheets

(51) Int. Cl.
*F16F 15/04* (2006.01)
*F16F 7/00* (2006.01)

(56) References Cited

U.S. PATENT DOCUMENTS 5,160,121 A * 11/1992 Bartholomew ....... F16F 3/0873
267/136
5,609,328 A * 3/1997 Loziuk ..................... F16F 7/14
267/136
6,648,295 B2 * 11/2003 Herren ................ F16F 15/0275
248/562

* cited by examiner

FIG. 1

VIBRATION ISOLATION DEVICES

CROSS-REFERENCE TO RELATED APPLICATIONS

This application claims priority from U.S. Provisional Application Ser. No. 62/132,493 filed 12 Mar. 2015, which is titled "VIBRATION ISOLATION DEVICES", which is hereby incorporated in its entirety by reference.

FIELD OF THE INVENTION

The present invention is for devices which isolate vibration. For example, they may be used to dampen or isolate vibrations from HVAC units.

BACKGROUND OF THE INVENTION

There exists in the prior art devices which provide mounting for mechanical or electro-mechanical devices, such as air conditioning units. The prior art additionally provides structures which absorb vibration. What is not taught in the art is a simple device which allows for easy replacement of the spring without need of removing one or more components (such as bolts, nuts, etc.). What is further not taught in the art is a vertical displacement limiting arrangement which functions to snub undesired movements and rotation.

SUMMARY OF THE INVENTION

The present is a vibration isolation device, said device comprising one or more spring means, one or more vertical limiter pairs wherein each of the one or more vertical limiter pairs has a slot therein with a predetermined width, an upper flange wherein one half of each respective pair of the one or more limiter pairs is in a fixed relationship with the upper flange, a lower flange wherein the other half of each respective pair of the one or more limiter pairs is in a fixed relationship with the lower flange, and wherein each of the vertical limiters each have a cross beam which fits into the opposing vertical limiters slot and the cross beam has a height H.

BRIEF DESCRIPTION OF THE FIGURES

FIG. 1 is a front view of an exemplary embodiment of the present invention.

DETAILED DESCRIPTION OF THE INVENTION

Figure 2:
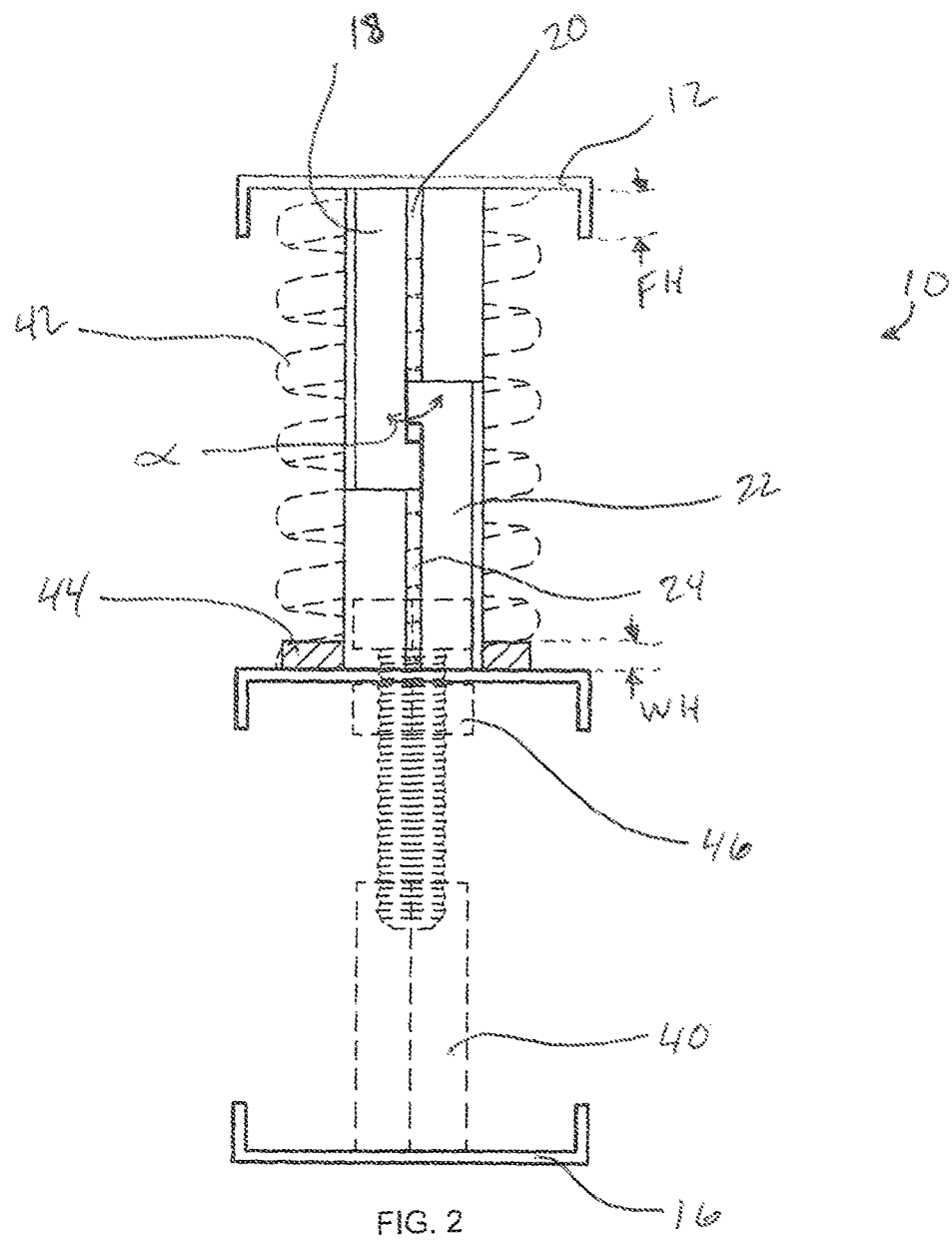
FIG. 2 is a right side view of the embodiment of FIG. 1.

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains. In the figures, like reference numbers represent the same component.

Figure 1:
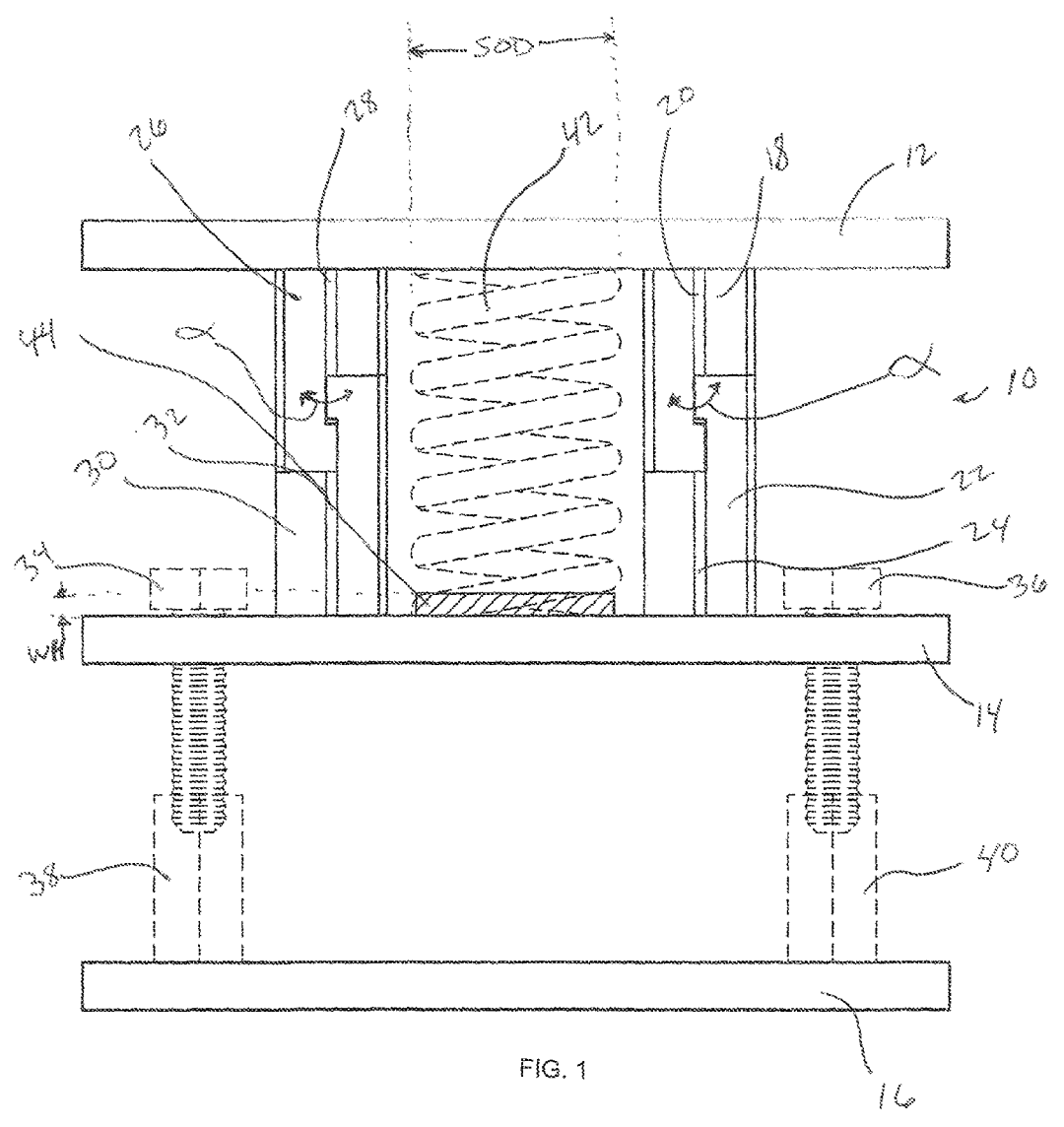

FIG. 1 is a front view of an exemplary embodiment of the present invention showing vibration isolation device 10, upper flange/top flange/first flange/top beam 12, bottom channel 14, bottom support 16, top vertical limiters 18, 26 having slots therein 20, 28, respectively, bottom vertical limiters 22, 30 having slots therein 24, 32, respectively, angle α between surfaces of respective vertical limiter pairs 18, 22 (showing that they are oriented in this example with angle α equal to 90°), bolts 34, 36, sleeves 38, 40, spring 42 (with spring outer diameter SOD), and washer 44 (with washer height WH). In some embodiments, angle α is equal to 90°.

FIG. 2 is a right side view showing vibration isolation device 10, upper flange/top flange/first flange/top beam 12, bottom channel 14, bottom support 16, top vertical limiters 18, 26 having slots therein 20, 28, respectively, bottom vertical limiters 22, 30 having slots therein 24, 32, respectively, angle α between surfaces of respective vertical limiter pairs 18, 22 (showing that they are oriented in this example with angle α equal to 90°), bolts 34, 36, sleeves 38, 40, spring 42 (with spring outer diameter SOD), and washer 44 (with washer height WH). Also illustrated is a slide nut/jacknut 46, flange height FH.

Figure 3:
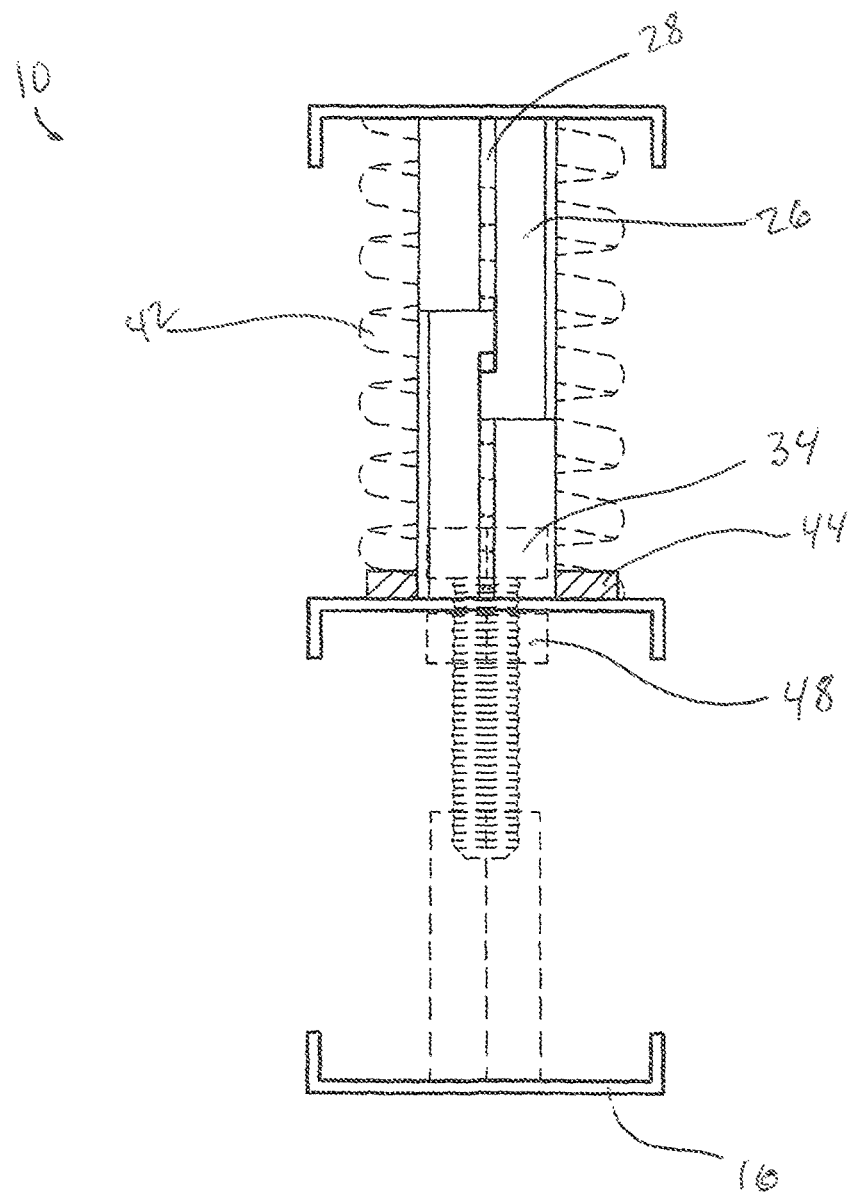
FIG. 3 is a left side view of the embodiment of FIGS. 1-2.

FIG. 3 is a left side view showing vibration isolation device 10, upper flange/top flange/first flange/top beam 12, bottom channel 14, bottom support 16, top vertical limiters 18, 26 having slots therein 20, 28, respectively, bottom vertical limiters 22, 30 having slots therein 24, 32, respectively, angle α between surfaces of respective vertical limiter pairs 18, 22 (showing that they are oriented in this example with angle α equal to 90°), bolts 34, 36, sleeves 38, 40, spring 42 (with spring outer diameter SOD), and washer 44 (with washer height WH). Also illustrated is a slide nut/jacknut 48, flange height FH.

Figure 4:
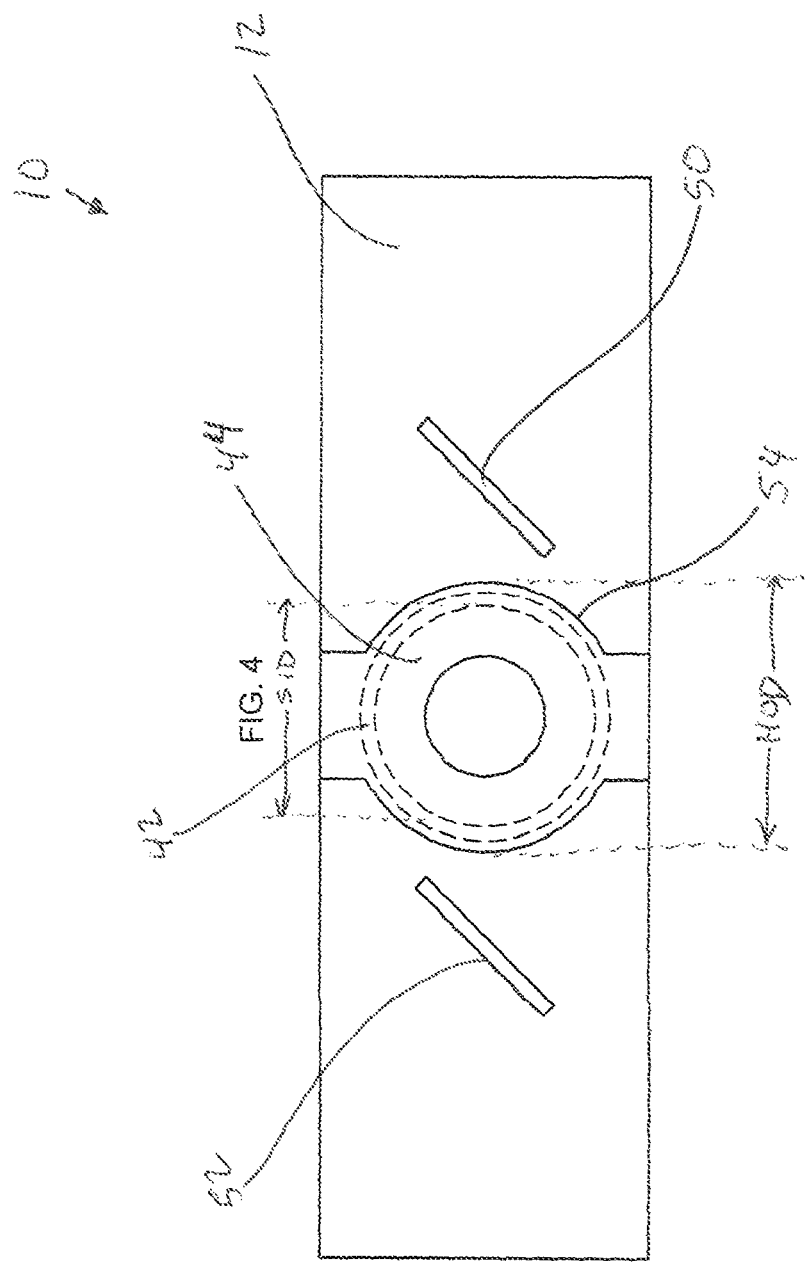
FIG. 4 is a top view of an exemplary embodiment of the present invention.

FIG. 4 is a top view of an exemplary embodiment of the present invention illustrating an exemplary upper flange/top flange 12 having locator slots 50, 52 for receiving vertical limiters 18, 26. In practice, the vertical limiters may be inserted into respective slots until the top surface of the vertical limiters is flush/even with the top surface of upper/top flange 12, and then the members (vertical limiters, for example) are welded, or otherwise fixed, in place. In other embodiments, they may be affixed by any suitable means or even unitary in construction (so long as the lower vertical limiters are suitably engaged with the upper vertical limiters (i.e., the vertical limiters' each have an engagement portion/cross beam which passes through the other vertical limiters' slot (and vice versa) and this arrangement is tight enough to prevent undesired rotation/twisting of the various components once so engaged. Thus, the pair(s) of vertical limiters (one top and one bottom) must be oriented to be interlocking (such as illustrated, for example), prior to affixing the various vertical limiters to their respective flange. The bottom vertical limiters are affixed to bottom channel 14. In this embodiment, spring outer diameter SOD is less than hole diameter HOD such that spring 42 may be inserted through hole 56 (see FIG. 5) or via hole 54 in this embodiment. In this embodiment washer 44 has a washer outer diameter WOD which is only slightly smaller than spring inner diameter SID such that washer 44 functions to fix the range of motion of spring 42 such that spring 42 does not slide along bottom channel 14.

Note that in this embodiment (see the other figures as well), if another surface is placed above upper flange 12, spring 42 may be removed by sliding it between upper channel 12 and lower channel 14 (i.e., slid to the left or right of the page in the embodiment of FIG. 3, for example). If spring 42 is under compression, it need only be slightly compressed (to overcome the vertical requirements of flange height FH and washer height WH) and then it may be removed between upper channel and lower channel 14 without need to remove any additional components since there are no members which extend through the center of the spring over the majority of the length of the spring. In this embodiment, there is no shaft which extends therethrough the central axis of spring 42 (friction and the spring force of the spring hold the spring in place). In some embodiments, washer height WH is less than or equal to ½ inch. In some embodiments, washer height WH is less than or equal to ¼ inch. In some embodiments, washer height WH is less than or equal to ⅛ inch. In some embodiments, washer height WH is less than or equal to 1/20 of the uncompressed spring height. In some embodiments, the combination of washer height WH and flange height FH is less than or equal to 1/15 of the uncompressed spring height/length. By definition herein, the dead load of spring 42 is equal to the minimum spring height of bottomed out spring 42. In some embodiments, the combination of washer height WH and flange height FH is less than or equal to ½ of the bottomed out/compression height of spring 42 (i.e., the springs full deflection). Note that although the illustrated embodiment shows a single spring and two mated pairs of vertical limiters, any number of springs and any number of pairs of vertical limiters may be used in a particular embodiment. In one embodiment, a pair of vertical limiters may be placed into the center of the spring or springs (as appropriate).

In the illustrated embodiment, angle α is equal to 90°. Further, the slots of the vertical limiters are rectangular and, in this embodiment, the cross sectional areas of at least the cross beam portions of the various vertical limiters are rectangular. The minimum spacing of the slots should be only slightly larger than the diameter of the cross beam such that the vertical limiter pairs prevent twisting and other undesired movements while still allowing movement (relative to each other) in one direction (and, by extension to connected flanges or other components/members). In this embodiment, it is preferred that the height (i.e., vertical measurement as illustrated in this embodiment) of the cross beam portion of the vertical limiters is at least 1.5 times the width of the respective slot. This serves to provide the device with the ability to substantially reduce or prevent undesired twisting and movements in directions other than those permitted by the slots. The sides of the slots engage with various portions of the vertical limiters to snub undesired motions.

Note that interior surfaces of the respective cross beams of two respective vertical limiters will come into contact when there is maximum separation of the flanges and the outer surfaces may come into contact with the opposing flange (i.e., the flange it is not in a fixed relationship with) to limit the minimum separation.

Figure 5:
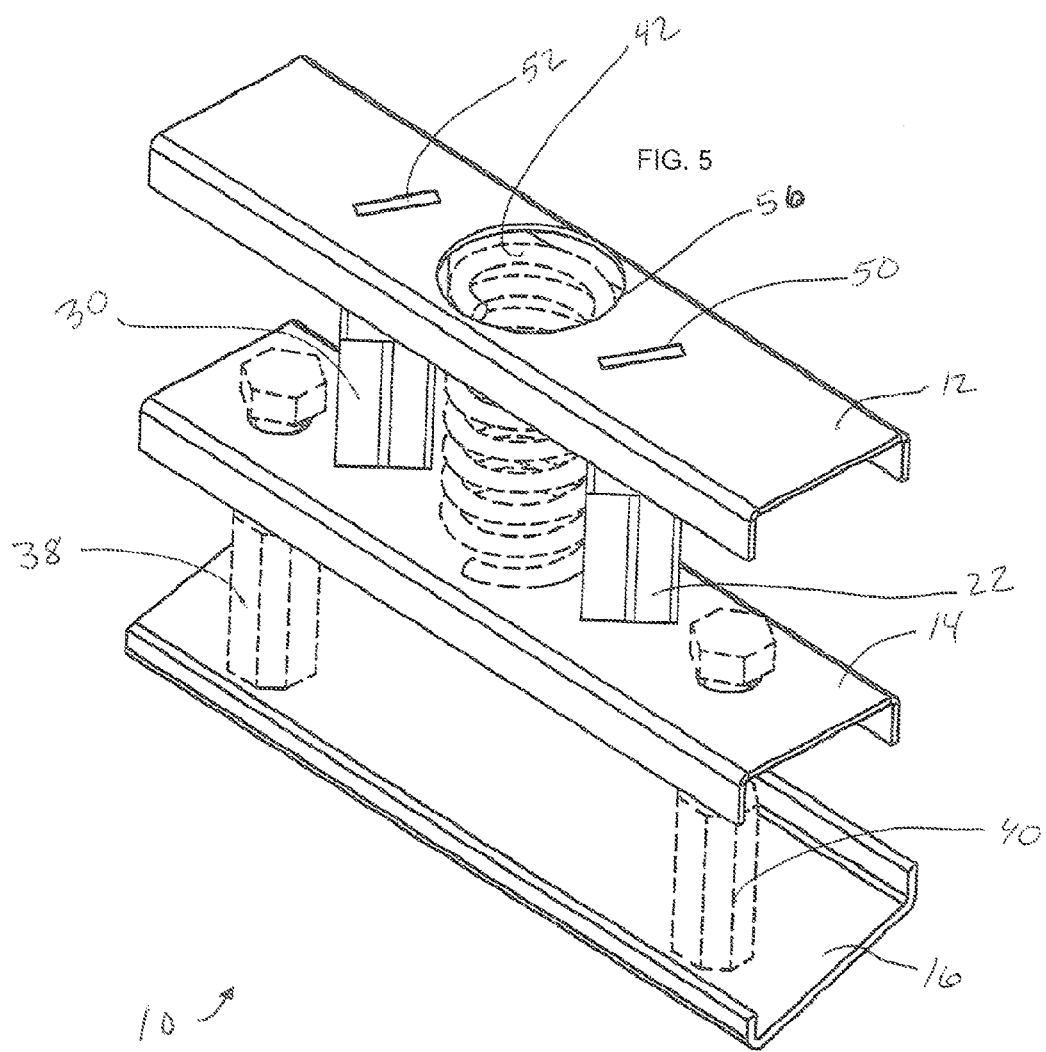
FIG. 5 is an isometric view of another exemplary embodiment of the present invention.

FIG. 5 is an isometric view of another exemplary embodiment of the present invention showing vibration isolation device 10, upper flange/top flange/first flange/top beam 12, bottom channel 14, bottom support 16, top vertical limiters 18, 26 having slots therein 20, 28, respectively, bottom vertical limiters 22, 30 having slots therein 24, 32, respectively, angle α between surfaces of respective vertical limiter pairs 18, 22 (showing that they are oriented in this example with angle α equal to 90°), bolts 34, 36, sleeves 38, 40, spring 42 (with spring outer diameter SOD), and washer 44 (with washer height WH). Also shown is hole 56 which is slightly larger than spring outer diameter SOD such that spring 42 may be inserted through hole 56. In other embodiments, there may be no hole and spring 42 may be inserted between flanges 12, 14.

Figure 6:
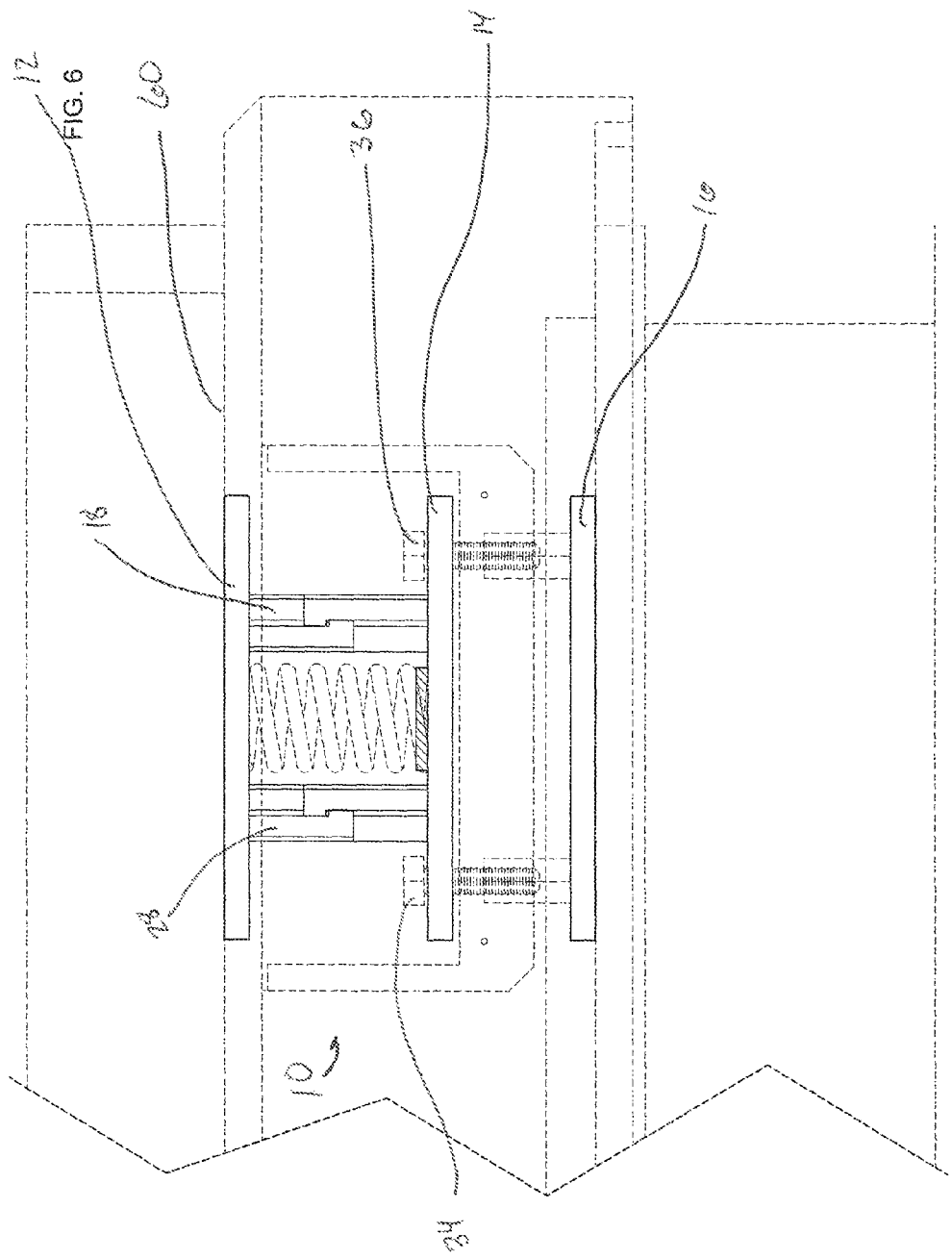
FIG. 6 is a front view of the embodiment of FIG. 5 along with an isolation rail in phantom lines.

FIG. 6 is a front view of the embodiment of FIG. 5 along with an isolation rail 60 in phantom lines and also illustrating various other components.

Figure 7:
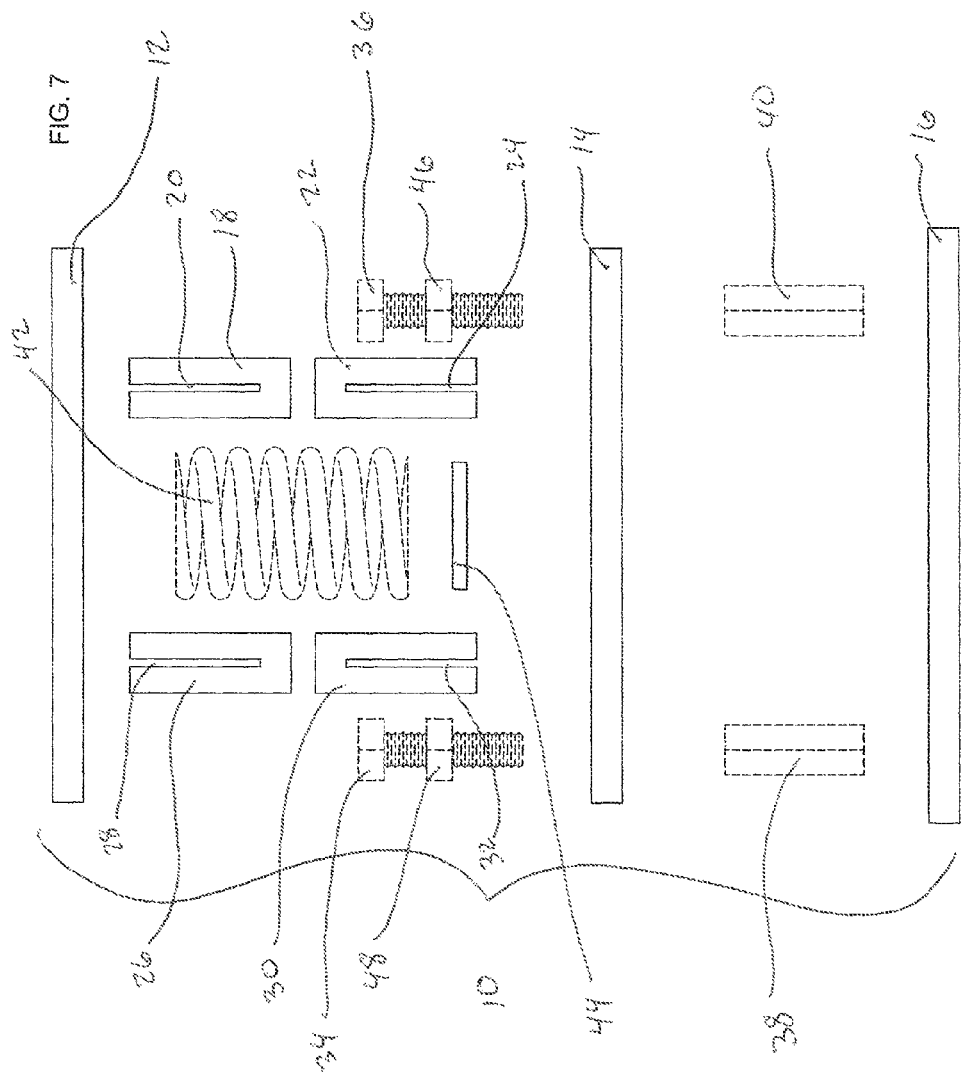
FIG. 7 is an exploded view of the embodiment of FIGS. 5-6.

FIG. 7 is an exploded view of an exemplary embodiment of the present invention.

Figure 8:
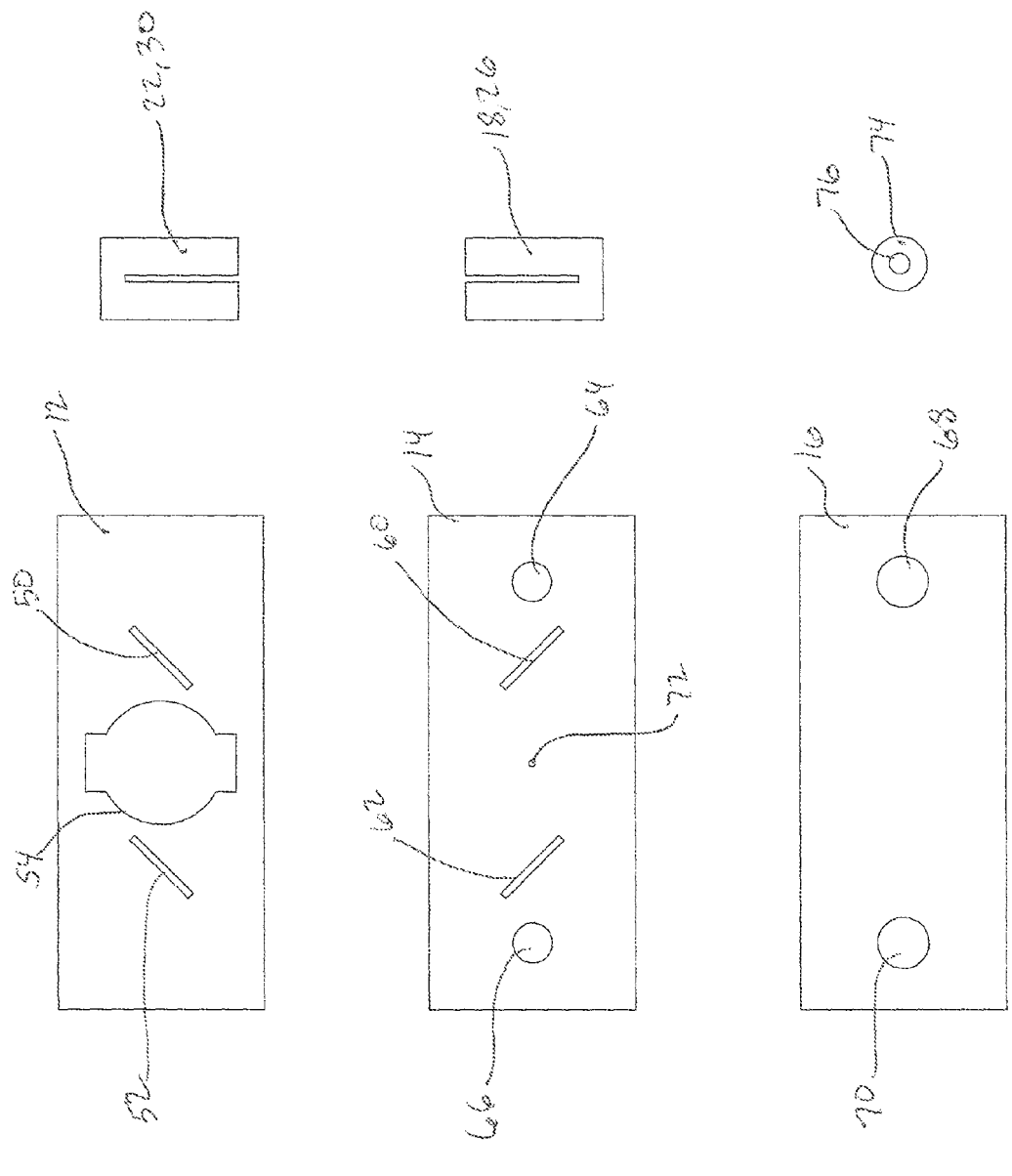
FIG. 8 is an exploded view of the flat components of the embodiment of FIGS. 5-7.

FIG. 8 is an exploded view of various flat components of an exemplary embodiment of the present invention including washer 74 (which may serve the same purpose as washer 44 in other embodiment) which may have a hole 76 therein. Also illustrated are holes 64, 66, 68, and 70 through various members for various bolts to pass through. Bolts 34, 36 (in combination with sleeve nuts 46, 48 and sleeves 38, 40) allow for the relationship between various members (i.e., the flange 14 and bottom support 16) to be adjustable as needed for a particular installation.

In various embodiments, the device allows for adjustability and can be tailored because of the removable spring. Various embodiments allow for a vertical and horizontal limited system that allows one range of motion, such as vertical, while providing lateral stability.

In some embodiments, the one or more spring means comprises a single coil spring. In some other embodiments, the one or more spring means comprises two coil springs. In some embodiments, the one or more vertical limiters/vertical adjustment means comprises two means, one on either side of the spring means (such as the engaging pairs of vertical limiters illustrated in various figures). The spring means may be comprised of any suitable components including, but not limited to, springs, coil springs, pneumatics, and elastics. In some embodiments, the vertical limiters may be rods, interlocking channels, or other means. Various members may be either unitary or otherwise. In some embodiments, various members may be permanently or temporarily attached. In some embodiments, the vertical limiters, for example, may be bonded, welded or otherwise attached to various other members. The interlocking channels allow variation of distance between various members as the spring or spring means contracts or expands as determined based on the particulars of the installation (i.e., predetermined). Thus, the vertical limiter pairs may be snubbers for vertical stability in various embodiments.

In some embodiments, the vertical limiters may have generally U shaped configuration. The slots may be rectangular/rectangular piped in configuration to accommodate the mated members cross beam/engagement portion. While the prior art teaches various spring means working against the lower surface of the upper flange/top flange (i.e., upper flange/top flange 12 in various embodiments), various embodiments of the present invention may have a hole in upper flange/top flange 12 such that the spring will work against another surface (such as that provided by an isolation rail (such as isolation rail 60 in FIG. 6). In such installations, it will be easier for an installer to insert the spring through a hole in the upper flange/top flange rather than having to compress it to fit it between the flanges. Due to the geometry of various embodiments, the spring is still easily swapped out if needed since there is nothing extending over the center of the spring to prevent its easy side access/removal (i.e., a shaft, bolt etc., does not have to be removed from the interior of the spring prior to removal).

Although various components of the present invention may be illustrated as being of a particular shape for convenience, such components may be of any suitable shape, configuration, orientation, etc. Note that although illustrated or discussed as being vertical or horizontal, the devices of the present invention may be in any orientation.

While the specification has been described in detail with respect to specific embodiments thereof, it will be appreciated that those skilled in the art, upon attaining an understanding of the foregoing, may readily conceive of alterations to, variations of, and equivalents to these embodiments.

What is claimed is:

1. A vibration isolation device, said device comprising:
   one or more spring means wherein said one or more spring means each have a first end and a distal second end,
   one or more vertical limiter pairs wherein each of said one or more vertical limiter pairs has a slot therein with a predetermined width,
   an upper flange wherein one half of each respective pair of said one or more limiter pairs is in a fixed relationship with said upper flange and said first end of each of said one or more spring means is positioned proximate said upper flange,
   a lower flange wherein the other half of each respective pair of said one or more limiter pairs is in a fixed relationship with said lower flange and said second end of each of said one or more spring means is positioned proximate said lower flange, and
   wherein each of said vertical limiter each have a cross beam which fits into the opposing vertical limiters slot and said cross beam has a height H
   and wherein said spring means can be removed without disassembling said spring means or removing said upper or said lower flanges.

2. The device according to claim 1, wherein said one or more spring means comprises a single coil spring.

3. The device according to claim 1, wherein said one or more spring means comprises two coil springs.

4. The device according to claim 1, wherein said one or more limiter pairs comprises a generally U shaped member wherein the pair of said vertical limiters are linked or joined such that the curve of the U portion engages with the other member such that they may slide in only one direction.

5. The device according to claim 1, wherein the height of said cross beam of said vertical limiter is at least 1.5 times the width of said slot to provide sufficient ability to prevent the various members from twisting with respect to each other.

6. The device according to claim 1, wherein said pair of vertical limiters are arranged such that they are at 90° to each other.

7. The device according to claim 1, wherein said slots are generally rectangular to accommodate the opposing vertical limiters cross beam and the slots and vertical limiters are engaged at 90°.

8. The device according to claim 1, wherein there is an unobstructed cavity on an interior of said spring means extending through a central axis of said spring.

9. The device according to claim 1, further comprising a washer having a washer height WH which is a fixed relation to said lower flange and said upper flange has a flange height FH and the combination of said height WH and said height FH is less than or equal to ½ the compression height of said spring for easy removal of said spring between said upper flange and said lower flange without need to remove any bolts, nuts, etc. by only compressing said spring.

10. The device according to claim 1, wherein said spring may be removed between a hole between said upper flange and said lower flange without removing any bolts, nuts, shafts, etc. which extend through said spring.

11. A vibration isolation device, said device comprising:
    one or more spring means,
    one or more vertical limiter pairs wherein each of said one or more vertical limiter pairs has a slot therein with a predetermined width,
    an upper flange wherein one half of each respective pair of said one or more limiter pairs is in a fixed relationship with said upper flange,
    a lower flange wherein the other half of each respective pair of said one or more limiter pairs is in a fixed relationship with said lower flange, and
    a hole through said upper flange at least as big as an outer diameter of said spring to allow insertion through said upper flange and
    wherein each of said vertical limiter each have a cross beam which fits into the opposing vertical limiters slot and said cross beam has a height H.

12. The device according to claim 1, wherein said spring does not operate directly against said upper flange.

13. The device according to claim 1, wherein said vertical limiters provide lateral stability such that sides of said slots interact and engage with surfaces of the opposing vertical limiter to prevent rotation and horizontal movement.

14. The device according to claim 1, further comprising a hole in said upper flange such that said one or more spring means may be place or removed through said hole.

15. The device according to claim 1, wherein said one or more spring means may be removed from one or more gaps between said upper flange and said lower flange.

* * * * *